INVENTOR.
ROBERT W. SCHUSTER
BY
AGENT

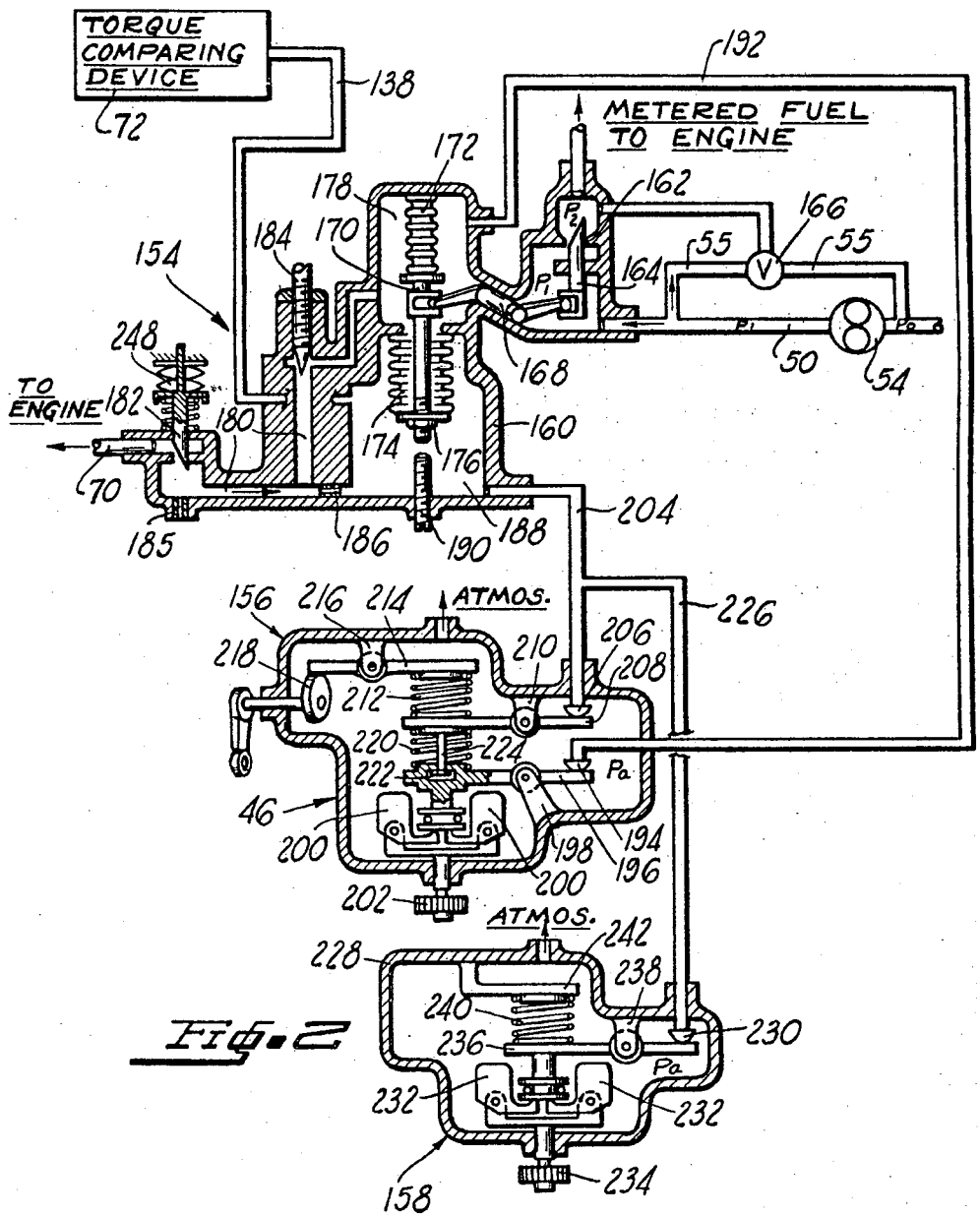

United States Patent Office 3,403,507
Patented Oct. 1, 1968

3,403,507
CONTROL APPARATUS FOR EQUALIZING AN ENGINE OPERATING CONDITION OF A PLURALITY OF GAS TURBINE ENGINES
Robert W. Schuster, South Bend, Ind., assignor to The Bendix Corporation, a corporation of Delaware
Filed Dec. 21, 1966, Ser. No. 603,639
9 Claims. (Cl. 60—39.15)

ABSTRACT OF THE DISCLOSURE

Control apparatus for equalizing the power output of two gas turbine engines wherein each engine is controlled by separate fuel control systems including engine torque sensing and comparing mechanisms provided with oppositely acting bellows one of which responds to a fluid pressure representing output torque of its associated engine and the other of which responds to a fluid pressure representing torque output of the other engine and control means actuated by the two bellows for reducing fuel flow to the associated engine in the event of the output torque thereof exceeding the output torque of the other engine.

Background of the invention

The present invention relates, in general, to fuel control apparatus for gas turbine engines and relates, in particular, to apparatus for sensing and comparing an operating condition of each engine in a multiple engine installation and modifying fuel flow to one or more of the engines to thereby equalize the sensed operating conditions of the engines.

Summary of the invention

In certain multiple engine installations, as for example a two-engine arrangement on an aircraft, it is desirable to maintain power output of the engines equal particularly during engine accelerations when relatively large power outputs of both engines are required. Those persons skilled in the art will recognize that an unbalance of power output between the two engines may result in an out of trim condition of the aircraft which, in turn, reduces the aerodynamic efficiency of the aircraft and increases the work of the pilot in controlling the attitude of the aircraft. It is therefore an object of the present invention to provide apparatus for sensing and comparing conditions indicative of the power output of each of two combustion engines, at least, and providing a power output error signal which is imposed on fuel flow to one of the two engines to thereby modify the power output thereof to equal the power output of the other engine.

It is an object of the present invention to provide apparatus for sensing and comparing conditions indicative of the power output of each of two combustion engines, at least, during engine accelerations and providing a power output error signal which is imposed on fuel flow to the faster accelerating engine to thereby reduce the acceleration thereof to that of the slower accelerating engine.

It is an object of the present invention to provide apparatus for sensing and comparing the torque output of two gas turbine engines adapted to accelerate simultaneously and producing a torque error output signal which is imposed on fuel flow to the faster accelerating engine to thereby reduce the acceleration thereof to that of the slower accelerating engine.

Other objects and advantages of the present invention will be apparent from the following description taken with the accompanying drawings.

Brief description of drawings

FIGURE 2 is a schematic sectional view of the present invention including one of the two identical fuel controls associated with the two engines of FIGURE 1.

Description of preferred embodiment

Figure 1:
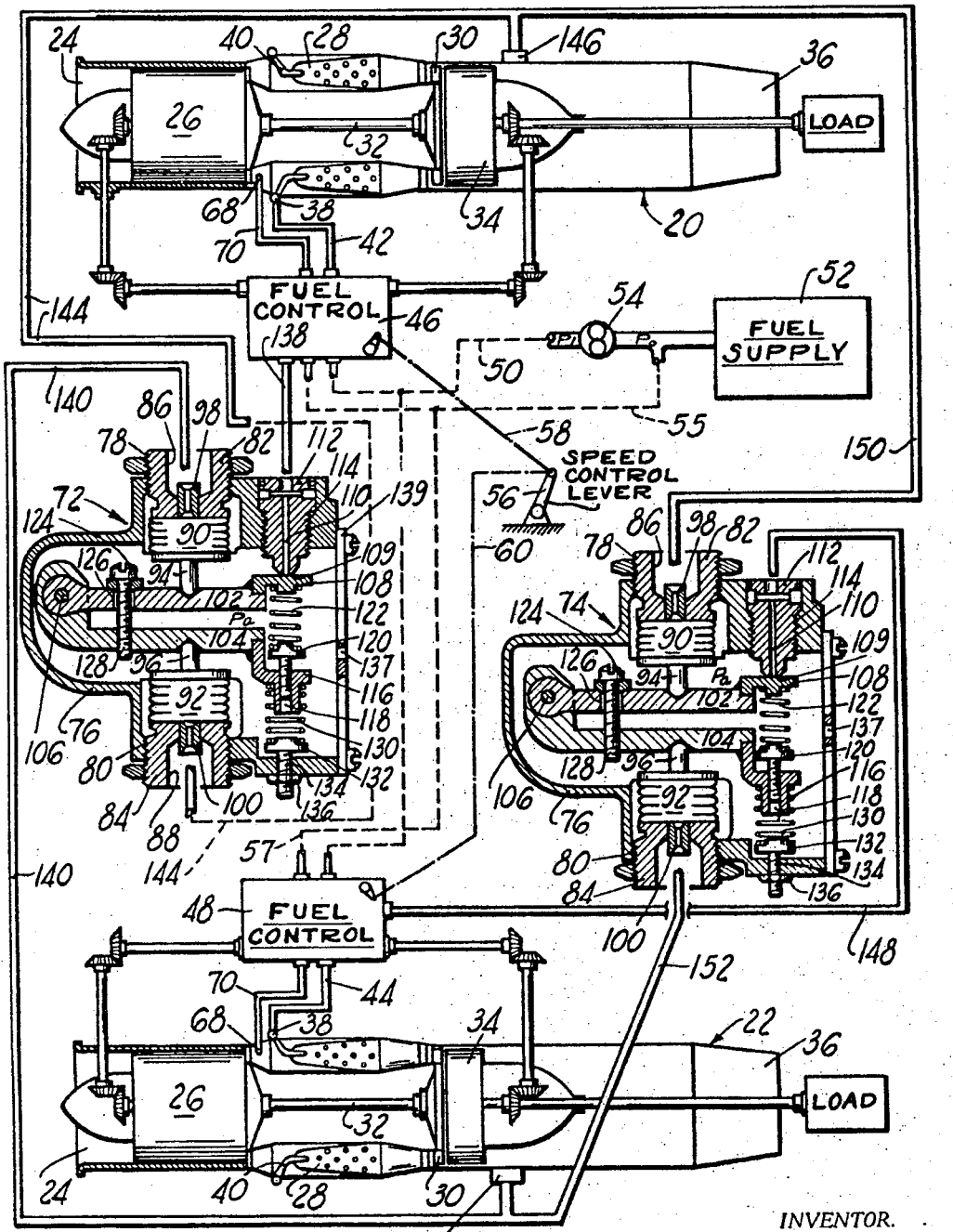
FIGURE 1 is a schematic representation of two gas turbine engines and fuel control system therefor embodying the present invention.

Referring to the drawings and, in particular, FIGURE 1, numerals 20 and 22 designate two similar gas turbine engines each having an air inlet 24 leading to an air compressor 26 which discharges to a plurality of combustion chambers 28. Hot motive gas generated in the combustion chambers 28 passes therefrom through rotatable mounted gas turbine 30 connected to drive compressor 26 via a shaft 32 and then through a power gas turbine 34 rotatably mounted independently of compressor 26 and adapted to provide a source of power for external use. The gases may exhaust from turbine 34 through nozzle 36 to the atmosphere.

A fuel manifold 38 supplies pressurized fuel to fuel nozzles 40 which, in turn, are connected to inject fuel into combustion chambers 28 where the resulting air and fuel mixture is ignited and burned to generate hot motive gas. A pressurized flow of metered fuel is supplied to each manifold 38 via associated conduits 42 and 44 leading from fuel control units 46 and 48, respectively. The fuel control units 46 and 48 are supplied unmetered pressurized fuel via bifurcated conduit 50 leading from a fuel tank 52 and provided with one or more engine driven fuel pumps 54 for pressurizing fuel flow therethrough. Fuel bypass conduits 55 and 57 connect fuel control units 46 and 48, respectively, with conduit 50 at the inlet side of pump 54.

A movable engine speed selection lever 56 is connected via links 58 and 60 to fuel control units 46 and 48, respectively, thereby providing a corresponding input signal to operate each fuel control unit 46 and 48.

A fluid pressure input signal $P_c$, derived from air discharged by compressor 26 in each of the engines 20 and 22, is transmitted via pressure pickup 68 and conduit 70 to associated fuel control units 46 and 48.

The fuel control units 46 and 48 are identical and of the pneumatic type such as disclosed in Patent No. 3,040,529, issued June 26, 1962, to J. E. Hurtle, and having a common assignee. FIGURE 2 is a sectional schematic view of one of the fuel controls 46 and 48 which is briefly described herein to the extent necessary to indicate the control function impressed thereon by the present invention. Reference is made to the above-mentioned Patent No. 3,040,529 for additional details of structure and/or operation of fuel control units 46 and 48.

Torque comparing devices generally indicated by 72 and 74 are connected to fuel control units 46 and 48, respectively. The torque comparing devices 72 and 74 each include a casing 76 having oppositely disposed threaded openings 78 and 80 formed therein. Fittings 82 and 84 provided with passages 86 and 88, respectively, are threadedly engaged with threaded openings 78 and 80, respectively. Bellows 90 and 92 are anchored to one end of fittings 82 and 84, respectively, by any suitable means providing an air tight seal such as brazing or the like. The movable closed ends of bellows 90 and 92 are provided with stems 94 and 96, respectively, centrally located thereon and fixedly secured thereto by any suitable means such as brazing or the like. Fluid flow restrictions 98 and 100 are secured in passages 86 and 88, respectively. Levers 102 and 104 pivotally mounted on a fixed pin 106 are engaged by stems 94 and 96, respectively. The free end of lever 102 is provided with a spring retaining member 108 fixedly secured thereto as by a weld and adapted to cooperate with a seat 109 at the discharge end of a fluid passage 110 formed in a valve fitting 112 which is threadedly engaged with a threaded opening 114 formed in casing 76. A spring retaining member 116 fixedly secured to the free end of lever 104 as by a weld is provided with a threaded opening 118 which receives a threaded stem of a spring retainer 120. A spring 122 interposed between retaining member 108 and spring retainer 120 urges the levers 102 and 104 apart to predetermined relative positions as determined by the setting of a stop member defined by a bolt 124 which slidably extends through an opening 126 in lever 102 into threaded engagement with a threaded opening 128 in lever 104. An adjustable preload is applied against lever 104 by a spring 130 interposed between spring retainer 116 and an adjustable spring retainer 132 threadedly engaged with a threaded opening 134 in casing 76. A lock nut 136 threadedly engaged with spring retainer 132 serves to lock the same in any desired position.

The interior of casing 76 is vented to the atmosphere via an opening 137 formed in a cover plate 139 suitably secured to casing 76.

The torque comparing device 72 is connected to vent a control fluid pressure from fuel control 46 to the interior of casing 76 at relatively low drain pressure $P_a$ via conduit 138 leading from fuel control 46 to valve fitting 112. The bellows 90 is vented interiorly via conduit 140 to a conventional torque sensing device 142 suitably connected to engine 22 and adapted to respond to a variable condition of power turbine 34 representative of output torque thereof and capable of producing a corresponding variable output fluid pressure signal to conduit 140. The torque sensing device 142 is a conventional device well known to those skilled in the art and is not described therefore in structural detail. The bellows 92 is vented interiorly via conduit 144 to a second conventional torque sensing device 146 equivalent to torque sensing device 142 and connected to respond to a variable condition of power turbine 34 of engine 20 representative of output torque thereof. The torque sensing device 146, like device 142, is capable of providing a variable output fluid pressure signal to conduit 144 which varies in accordance with the torque output of associated turbine 34.

The torque comparing device 74 is connected to vent a control fluid pressure from fuel control 48 to the interior of casing 76 at relatively low drain fluid pressure $P_a$ via a conduit 148 leading to valve fitting 112. The bellows 90 is vented interiorly to torque sensing device 146 via conduit 150. The bellows 92 is vented interiorly to torque sensing device 142 via a conduit 152.

Referring to FIGURE 2, there is shown one of the two identical fluid control units 46 and 48 in section. The remaining fuel control unit, not shown, is a duplicate in structure and operation and need not therefore be described.

The fuel control 46 includes three sections which are designated as a pneumatic pressure responsive fuel regulating portion 154 and first and second speed responsive portions 156 and 158, respectively. The portion 154 includes casing 160 containing a fuel metering orifice 162 controlled by a contoured metering valve 164 to thereby establish a variable metering area and thus schedule fuel flow accordingly to the engine 20. The orifice 162 receives fuel at relatively high pressure $P_1$ via supply conduit 50 and discharges metered fuel to conduit 42 leading to manifold 38. The pressure drop across orifice 162 is controlled by a conventional by-pass valve generally indicated by 166 which is sensitive to the pressure drop across the orifice 162 and operative to bypass fuel through conduit 55 from conduit 50 at pump discharge pressure $P_1$ to conduit 50 at pump inlet pressure $P_0$ as necessary to maintain a desired pressure differential $P_1-P_2$ across orifice 162. The metering valve 164 is connected to one end of a lever 168 suitably secured to casing 160 for movement relative thereto and provided with suitable fluid seal means, not shown, which prevents fluid leakage between casing 160 and lever 168. The opposite end of lever 168 is connected to a stem 170 which is fixedly secured at one end to the movable closed end of an evacuated bellows 172 and at the opposite end to the movable end of a bellows 174 via a suitable connecting means including nut 176 threadedly engaged with stem 170. The bellows 172 and 174 are anchored at one end to casing 160 and together with casing 160 define a chamber 178. Compressor discharge air at pressure $P_c$ is supplied to chamber 178 via conduit 70 and a conduit 180. The effective flow area of conduit 180 is controlled by conventional ambient air temperature responsive valve mechanism 182 and a manually adjustable valve member 184 arranged in series flow relationship in conduit 180. A fixed area restriction 185 vents conduit 180 downstream of valve mechanism 182 to atmospheric air at pressure $P_a$ thereby establishing a continuous, relatively low, rate of air flow through passage 180 for control purposes. A restricted branch passage 186 connects conduit 180 intermediate valves 182 and 184 with the exterior of bellows 174 which together with casing 160 defines a chamber 188. An adjustable stop 190 threadedly engaged with casing 160 is adapted to be engaged by stem 170 to thereby limit the travel of the same accordingly.

The chamber 178 is vented via a conduit 192 to first speed responsive device 156 which is provided with a flapper valve 194 suitably arranged to control the effective flow area of conduit 192 which exhausts to atmospheric air pressure $P_a$. The flapper valve 194 is activated by a lever 196 pivotally mounted on a fixed support 198. Conventional centrifugal speed weights 200 rotated by turbine 30 through a suitable gear and shafting arrangement generally indicated by 202 are connected to the opposite end of lever 196 to load the same with a force which varies as a function of the speed of rotation of turbine 30.

The chamber 188 is vented via a conduit 204 to first speed responsive device 156 which is provided with a flapper valve 206 suitably arranged to control the effective flow area of conduit 204 which exhausts to atmospheric air pressure $P_a$. The flapper valve 206 is actuated by a lever 208 pivotally mounted on a fixed support 210. The lever 208 is loaded by a compression spring 212 interposed between the free end of lever 208 and one end of a lever 214 pivotally mounted on a fixed support 216. The opposite end of lever 214 is engaged by a rotatably actuated cam 218 suitably connected to and actuated by power control lever 62 via link 64. A compression spring 220 interposed between lever 208 and lever 196 is aligned with spring 212 and tends to urge lever 196 away from lever 208 into engagement with a stop 222 fixedly secured to lever 208 via stem 224.

The chamber 188 is also vented to second speed responsive device 158 via conduit 226 leading from conduit 204 upstream from flapper valve 206 to the interior of casing 228 of speed responsive device 158. A flapper valve 230 is suitably arranged to control the effective flow area of conduit 226 which exhausts to atmospheric air pressure $P_a$. Conventional centrifugal speed weights 232 rotated by turbine 34 through suitable gear and shafting arrangement generally indicated by 234 are connected to impose a thrust force against one end of a lever 236 pivotally mounted on a fixed support 238 and engageable at its opposite end with flapper valve 230. A compression spring 240 is interposed between the one end of lever 236 and one end of a fixed spring retainer 242 suitably secured to casing 228.

*Operation*

It will be understood that the power output turbine 34 of each engine 20 and 22 may be connected to various power absorbing devices generally indicated as "Load" in FIGURE 1. However, in a preferred embodiment the load tively. The free end of lever 102 is provided with a spring retaining member 108 fixedly secured thereto as by a weld and adapted to cooperate with a seat 109 at the discharge end of a fluid passage 110 formed in a valve fitting 112 which is threadedly engaged with a threaded opening 114 formed in casing 76. A spring retaining member 116 fixedly secured to the free end of lever 104 as by a weld is provided with a threaded opening 118 which receives a threaded stem of a spring retainer 120. A spring 122 interposed between retaining member 108 and spring retainer 120 urges the levers 102 and 104 apart to predetermined relative positions as determined by the setting of a stop member defined by a bolt 124 which slidably extends through an opening 126 in lever 102 into threaded engagement with a threaded opening 128 in lever 104. An adjustable preload is applied against lever 104 by a spring 130 interposed between spring retainer 116 and an adjustable spring retainer 132 threadedly engaged with a threaded opening 134 in casing 76. A lock nut 136 threadedly engaged with spring retainer 132 serves to lock the same in any desired position.

The interior of casing 76 is vented to the atmosphere via an opening 137 formed in a cover plate 139 suitably secured to casing 76.

The torque comparing device 72 is connected to vent a control fluid pressure from fuel control 46 to the interior of casing 76 at relatively low drain pressure $P_a$ via conduit 138 leading from fuel control 46 to valve fitting 112. The bellows 90 is vented interiorly via conduit 140 to a conventional torque sensing device 142 suitably connected to engine 22 and adapted to respond to a variable condition of power turbine 34 representative of output torque thereof and capable of producing a corresponding variable output fluid pressure signal to conduit 140. The torque sensing device 142 is a conventional device well known to those skilled in the art and is not described therefore in structural detail. The bellows 92 is vented interiorly via conduit 144 to a second conventional torque sensing device 146 equivalent to torque sensing device 142 and connected to respond to a variable condition of power turbine 34 of engine 20 representative of output torque thereof. The torque sensing device 146, like device 142, is capable of providing a variable output fluid pressure signal to conduit 144 which varies in accordance with the torque output of associated turbine 34.

The torque comparing device 74 is connected to vent a control fluid pressure from fuel control 48 to the interior of casing 76 at relatively low drain fluid pressure $P_a$ via a conduit 148 leading to valve fitting 112. The bellows 90 is vented interiorly to torque sensing device 146 via conduit 150. The bellows 92 is vented interiorly to torque sensing device 142 via a conduit 152.

Referring to FIGURE 2, there is shown one of the two identical fluid control units 46 and 48 in section. The remaining fuel control unit, not shown, is a duplicate in structure and operation and need not therefore be described.

The fuel control 46 includes three sections which are designated as a pneumatic pressure responsive fuel regulating portion 154 and first and second speed responsive portions 156 and 158, respectively. The portion 154 includes casing 160 containing a fuel metering orifice 162 controlled by a contoured metering valve 164 to thereby establish a variable metering area and thus schedule fuel flow accordingly to the engine 20. The orifice 162 receives fuel at relatively high pressure $P_1$ via supply conduit 50 and discharges metered fuel to conduit 42 leading to manifold 38. The pressure drop across orifice 162 is controlled by a conventional by-pass valve generally indicated by 166 which is sensitive to the pressure drop across the orifice 162 and operative to bypass fuel through conduit 55 from conduit 50 at pump discharge pressure $P_1$ to conduit 50 at pump inlet pressure $P_0$ as necessary to maintain a desired pressure differential $P_1 - P_2$ across orifice 162. The metering valve 164 is connected to one end of a lever 168 suitably secured to casing 160 for movement relative thereto and provided with suitable fluid seal means, not shown, which prevents fluid leakage between casing 160 and lever 168. The opposite end of lever 168 is connected to a stem 170 which is fixedly secured at one end to the movable closed end of an evacuated bellows 172 and at the opposite end to the movable end of a bellows 174 via suitable connecting means including nut 176 threadedly engaged with stem 170. The bellows 172 and 174 are anchored at one end to casing 160 and together with casing 160 define a chamber 178. Compressor discharge air at pressure $P_c$ is supplied to chamber 178 via conduit 70 and a conduit 180. The effective flow area of conduit 180 is controlled by conventional ambient air temperature responsive valve mechanism 182 and a manually adjustable valve member 184 arranged in series flow relationship in conduit 180. A fixed area restriction 185 vents conduit 180 downstream of valve mechanism 182 to atmospheric air at pressure $P_a$ thereby establishing a continuous, relatively low, rate of air flow through passage 180 for control purposes. A restricted branch passage 186 connects conduit 180 intermediate valves 182 and 184 with the exterior of bellows 174 which together with casing 160 defines a chamber 188. An adjustable stop 190 threadedly engaged with casing 160 is adapted to be engaged by stem 170 to thereby limit the travel of the same accordingly.

The chamber 178 is vented via a conduit 192 to first speed responsive device 156 which is provided with a flapper valve 194 suitably arranged to control the effective flow area of conduit 192 which exhausts to atmospheric air pressure $P_a$. The flapper valve 194 is activated by a lever 196 pivotally mounted on a fixed support 198. Conventional centrifugal speed weights 200 rotated by turbine 30 through a suitable gear and shafting arrangement generally indicated by 202 are connected to the opposite end of lever 196 to load the same with a force which varies as a function of the speed of rotation of turbine 30.

The chamber 188 is vented via a conduit 204 to first speed responsive device 156 which is provided with a flapper valve 206 suitably arranged to control the effective flow area of conduit 204 which exhausts to atmospheric air pressure $P_a$. The flapper valve 206 is actuated by a lever 208 pivotally mounted on a fixed support 210. The lever 208 is loaded by a compression spring 212 interposed between the free end of lever 208 and one end of a lever 214 pivotally mounted on a fixed support 216. The opposite end of lever 214 is engaged by a rotatably actuated cam 218 suitably connected to and actuated by power control lever 62 via link 64. A compression spring 220 interposed between lever 208 and lever 196 is aligned with spring 212 and tends to urge lever 196 away from lever 208 into engagement with a stop 222 fixedly secured to lever 208 via stem 224.

The chamber 188 is also vented to second speed responsive device 158 via conduit 226 leading from conduit 204 upstream from flapper valve 206 to the interior of casing 228 of speed responsive device 158. A flapper valve 230 is suitably arranged to control the effective flow area of conduit 226 which exhausts to atmospheric air pressure $P_a$. Conventional centrifugal speed weights 232 rotated by turbine 34 through suitable gear and shafting arrangement generally indicated by 234 are connected to impose a thrust force against one end of a lever 236 pivotally mounted on a fixed support 238 and engageable at its opposite end with flapper valve 230. A compression spring 240 is interposed between the one end of lever 236 and one end of a fixed spring retainer 242 suitably secured to casing 228.

*Operation*

It will be understood that the power output turbine 34 of each engine 20 and 22 may be connected to various power absorbing devices generally indicated as "Load" in FIGURE 1. However, in a preferred embodiment the load The restrictions 98 and 100 associated with bellows 90 and 92, respectively, function to minimize loss of fluid flow from associated conduits 144, 140, 150 and 152 in the event that bellows 90 and/or 92 rupture thereby exposing the interior of the ruptured bellows to relatively low pressure atmospheric air $P_a$.

It will be understood that various changes and modifications in the above described apparatus may be made by those persons skilled in the art, without departing from the scope of applicant's invention as defined by the following claims.

I claim:

1. Control apparatus for coordinating the relative power outputs of at least two combustion engines connected to drive power absorbing devices comprising:

first fuel control means operatively connected to one of the two combustion engines and responsive to a first variable fluid pressure generated by said one engine for controlling fuel flow thereto as a function of said first variable fluid pressure;

second fuel control means operatively connected to the other of the two combustion engines and responsive to a second variable fluid pressure generated by said other engine for controlling fuel flow thereto as a function of said second variable fluid pressure;

first and second condition responsive means operatively connected to said one and said other combustion engines, respectively, and responsive to first and second variable conditions of engine operation related to engine power output of said one and said other combustion engines, respectively;

said first and second condition responsive means being operative to compare said first and second variable conditions of engine operation during an acceleration of said two engines to a selected speed and generate a first output signal representing predominance of said first variable condition of engine operation;

first control means operatively connected to said first fuel control means and said first and second condition responsive means for modifying said first variable engine generated fluid pressure in response to said first output signal to modify fuel flow to said one combustion engine and reduce the power output thereof accordingly during said acceleration to a selected speed;

third and fourth condition responsive means operatively connected to said one and said other combustion engines, respectively, and responsive to said first and second variable conditions of engine operation and operative to compare said first and second variable conditions of engine operation during said acceleration to a selected speed and generate a second output signal representing predominance of said second variable condition of engine operation;

second control means operatively connected to said second fuel control means and said third and fourth condition responsive means for modifying said second variable engine generated fluid pressure in response to said second output signal to modify fuel flow to said other combustion engine and reduce the power output thereof accordingly during said acceleration to a selected speed.

2. Control apparatus as claimed in claim 1 wherein said combustion engines each includes an air compressor:

said first variable engine generated fluid pressure is compressor discharge air pressure of said one combustion engine; and said second variable engine generated fluid pressure is compressor discharge air pressure of said other combustion engine.

3. Control apparatus as claimed in claim 1 wherein: said first and second variable conditions of engine operation related to engine power output represent engine torque output.

4. Control apparatus as claimed in claim 1 wherein both of the combustion engines are adapted to be simultaneously accelerated to a selected engine speed:

said first and second fuel controls being operative in response to said first and second output signals, respectively, to reduce fuel flow to one or the other of the two accelerating engines depending upon which engine accelerates faster thereby equalizing the acceleration rates of the two engines.

5. Control apparatus as claimed in claim 1 wherein:

said first and second condition responsive means includes first and second fluid pressure responsive means, respectively, responsive to variable fluid pressures generated as a function of said first and second variable conditions of engine operation related to engine power output, respectively;

first pivotally mounted lever means operatively connected to said first and second fluid pressure responsive means and loaded by opposing forces derived therefrom;

first valve means operatively connected to said first lever means and connected to modify said first variable engine generated fluid pressure in response to said first fluid pressure responsive means overcoming said second fluid pressure responsive means;

said third and fourth condition responsive means includes third and fourth fluid pressure responsive means, respectively, responsive to variable fluid pressures generated as a function of said first and second variable conditions of engine operation related to engine power output, respectively;

second pivotally mounted lever means operatively connected to said third and fourth fluid pressure responsive means and loaded by opposing forces derived therefrom; and second valve means operatively connected to said second lever means and connected to modify said second variable engine generated fluid pressure in response to said third pressure responsive means overcoming said fourth fluid pressure responsive means.

6. Control apparatus as claimed in claim 5 wherein:

said first and second lever means each include first and second lever members pivotally mounted at one end, resilient means interposed between said lever members for urging the same apart, stop means carried by one of said first and second lever members and engageable with the other of said first and second lever members for limiting the relative movement thereof;

said first valve means being operatively connected to and actuated by its associated first lever member;

said first and second fluid pressure responsive means being operatively connected to their associated first and second lever members, respectively, and adapted to load the same in opposition to said resilient means;

said first fluid pressure responsive means being operative in response to a predetermined maximum allowable value of said variable fluid pressure generated as a function of said first variable condition of engine operation related to engine power output to overcome said resilient means thereby urging said first lever member towards said second lever member and actuating said first valve means in an opening direction to reduce said first variable engine generated fluid pressure thereby reducing fuel flow to said one engine to limit the power output thereof;

said second valve means being operatively connected to and actuated by its associated first lever member;

said third and fourth fluid pressure responsive means being operatively connected to their associated first and second lever members, respectively, and adapted to load the same in opposition to said resilient means;

said third fluid pressure responsive means being operative in response to a predetermined maximum allowable value of said variable fluid pressure generated as a function of said second variable condition of engine operation related to engine power output to overcome said resilient means thereby urging said first lever member toward said second lever member and actuating said second valve means in an opening direction to reduce said second variable engine generated fluid pressure thereby reducing fuel flow to said other engine to limit the power output thereof.

7. Fuel control apparatus for at least two gas turbine engines each having an air compressor, a first gas turbine connected to drive the air compressor, an independently rotatable second gas turbine for producing a power output for external use, a speed control lever for controlling the speed of the second gas turbine, said fuel control apparatus comprising:

first fuel control means operatively connected to one of said two gas turbine engines for controlling a flow of pressurized fuel thereto and thus the power output thereof;

second fuel control means operatively connected to the other of said two gas turbine engines for controlling a flow of pressurized fuel thereto and thus the power output thereof;

said first and second fuel control means being operatively connected to the speed control lever and operable to respond to movement of said speed control levers to effect simultaneous acceleration of the two gas turbine engines to a selected engine power and speed setting;

first control means operatively connected to said first fuel control means and the two gas turbine engines and responsive to first and second output signals representing torque output of one and the other gas turbine engines, respectively;

second control means operatively connected to said second fuel control means and the two gas turbine engines and responsive to said first and second output signals;

said first control means being operative to sense and compare said first and second output signals representing torque output and impose an output error signal representative of said first output signal exceeding said second output signal on said first fuel control means to thereby reduce fuel flow to said one engine and equalize the torque output of the two gas turbine engines accordingly;

said second control means being operative to sense and compare said first and second output signals representing torque output and impose an output error signal representative of said second output signal execeeding said first output signal on said second fuel control means to thereby reduce fuel flow to said other engine and equalize the torque output of the two gas turbine engines accordingly.

8. Fuel control apparatus as claimed in claim 7 wherein:

said first and second control means are responsive to a predetermined maximum allowable value of said first and second output signals, respectively, representing corresponding maximum allowable torque output of the respective gas turbine engines;

said first control means being operative to impose an output signal representing said maximum allowable value of said first output signal on said first fuel control means to reduce fuel flow to said one engine thereby limiting the torque output thereof;

said second control means being operative to impose an output signal representing said maximum allowable value of said second output signal on said second fuel control means to reduce fuel flow to said other engine thereby limiting the torque output thereof.

9. Control apparatus as claimed in claim 1 wherein:

said first and second condition responsive means as well as said third and fourth condition responsive means are operative to compare said first and second variable conditions of engine operation and generated said first and second output signals to modify fuel flow to said respective one and other combustion engines, respectively, during engine governing operation at a selected engine speed.

References Cited

UNITED STATES PATENTS

| | | | |
|---|---|---|---|
| 2,226,865 | 12/1940 | Kirchhoff | 137—85 |
| 2,985,182 | 5/1961 | Williams | 137—85 |
| 3,040,529 | 6/1962 | Hurtle | 60—39.28 |
| 3,200,886 | 8/1965 | Magri et al. | 60—39.15 XR |
| 3,234,740 | 2/1966 | Moore | 60—39.15 XR |
| 3,307,351 | 3/1967 | Wheeler et al. | 60—39.15 |

JULIUS E. WEST, *Primary Examiner.*